US006182736B1

United States Patent
Cunningham et al.

(12) United States Patent
(10) Patent No.: US 6,182,736 B1
(45) Date of Patent: Feb. 6, 2001

(54) HELPER ARM FOR A RIM HOLDING TIRE CHANGER

(75) Inventors: Charles L. Cunningham, Nashville; David M. Carpenter, Brentwood, both of TN (US)

(73) Assignee: Hennessy Industries, Inc., LaVergne, TN (US)

( * ) Notice: Under 35 U.S.C. 154(b), the term of this patent shall be extended for 0 days.

(21) Appl. No.: 09/097,432

(22) Filed: Jun. 15, 1998

(51) Int. Cl.$^7$ .................................................. B60C 25/135

(52) U.S. Cl. ......................... 157/1.24; 157/1.2; 157/1.17

(58) Field of Search .................................. 157/1.17, 1.2, 157/1.22, 1.24

(56) References Cited

U.S. PATENT DOCUMENTS

| D. 269,879 | 7/1983 | Holladay et al. . | |
|---|---|---|---|
| D. 293,916 | 1/1988 | Cunningham et al. . | |
| 3,522,832 | * 8/1970 | Held | 157/1.22 |
| 3,746,069 | 7/1973 | Blomgren, Sr. et al. . | |
| 4,196,766 | 4/1980 | Leeper et al. . | |
| 4,209,053 | * 6/1980 | Du Quesne | 157/1.24 |
| 4,245,686 | 1/1981 | Holladay . | |
| 4,324,282 | 4/1982 | Leeper . | |
| 4,327,794 | 5/1982 | Leeper et al. . | |
| 4,393,914 | 7/1983 | Leeper . | |
| 4,417,614 | 11/1983 | Cunningham et al. . | |
| 4,606,393 | 8/1986 | Cuccolini . | |
| 4,615,370 | 10/1986 | Cuccolini . | |
| 4,811,774 | * 3/1989 | Dale et al. | 157/1 X |
| 4,830,079 | 5/1989 | Onuma . | |
| 4,986,328 | 1/1991 | Matzger . | |
| 5,219,012 | 6/1993 | Corghi . | |
| 5,226,465 | * 7/1993 | Schon et al. | 157/1.24 X |
| 5,339,880 | 8/1994 | Kawabe et al. . | |
| 5,381,843 | 1/1995 | Corghi . | |
| 5,472,034 | 12/1995 | Corghi . | |
| 5,752,555 | * 5/1998 | Cunningham et al. | 157/1.24 |
| 5,941,294 | * 8/1999 | Cunningham et al. | 157/1.24 |
| 6,056,034 | 5/2000 | Matnick . | |

FOREIGN PATENT DOCUMENTS 417373    7/1966 (CH) .

OTHER PUBLICATIONS

Brochure of Classic Plus Butler—The Ultimate In Its Class—1995.
Brochure of Sicam Combined Version—1995.
Brochure of Hofmann monty PW—1994.
Brochure of Faip systems—1994.
Brochure of Faip assistant—1996.
Brochure of Faip Idea—1996.
Brochure of Fiuliand Silver Moon—1996.
Drawing of brochure of Giuliand device—1996.
Brochure of Servo System—1996.
Brochure of MH200—1996.

(List continued on next page.)

*Primary Examiner*—David A. Scherbel
*Assistant Examiner*—Anthony Ojini (57) ABSTRACT

A helper arm for use in conjunction with a rim-holding tire changer for assisting with the mounting/demounting of a tire. The helper arm comprises an arm having one end attached to a support device and an opposite end operably attached to an adjustable vertical member. The arm is preferably jointed and pivotally attached to the support device. Controls are provided to enable vertical adjustment of the vertical member. The vertical member may comprise a cylinder assembly having a cylinder shaft that may be moved up or down into operable engagement with the tire and wheel rim. A contact block is attached to the lower end of the cylinder. The contact block includes an attachment head configured to enable attachment of the block to the vertical member. Further, the contact block includes a shoulder having a rim-stop surface, a hook member opposite the shoulder, a heel extending downwardly from the body of the block and an instep along the underside of the block.

9 Claims, 8 Drawing Sheets

OTHER PUBLICATIONS

Brochure of Smontagomme Tyre Change Démonte pneus—1996.
Brochure of Faip Idea—1997.
Brochure of Fiuliand Silver 2000—1997.
Brochure of Ravaglioli—1997.
Brochure of Faip F40 Royal—1995.
Brochure of Banzai Tire Changer (undated but admitted to be prior art).
Brochure of Exceed Hi–Grade PC Tire Changer (undated but admitted to be prior art).

* cited by examiner

HELPER ARM FOR A RIM HOLDING TIRE CHANGER

BACKGROUND OF THE INVENTION

The present invention relates generally to the realm of tire changing, where many machines, devices and accessories are designed to assist in making the process of changing a tire less physical and more efficient.

It will be appreciated by those skilled in the art of designing and manufacturing equipment used to change the tubeless tires mounted on the rims of cars, light trucks and other vehicles, that such equipment must perform quickly and efficiently in order to be competitive in the marketplace. Modest improvements in the industry can thus become significant.

The type of equipment for which Applicant's invention is designed is the swing-arm rim-holding tire changer. Examples of such equipment include the tire changers manufactured by Hennessy Industries, Inc., Applicant's Assignee and marketed under the trademarks COATS™ and AMMCO™, including the COATS™ Model 5030A, Model 5060A-E and Model 5060AX-EX. However, there are many manufacturers of such equipment, including FMC Corporation of Chicago, Ill.; Corghi of Correggio, Italy, and SICE of Correggio, Italy. Equipment of this type has been readily available and on the market for many years, is the subject matter of numerous patents and has been described in a variety of publications, bulletins and brochures, operating instructional manuals, and the like. One such machine is illustrated in the design patent issued to Applicant as co-inventor in U.S. Design Pat. No. 293,916.

In the normal tire-changing procedure, the operator places a rim on the table of the rim-holding tire changer, secures the rim to the table, places a tire over the rim, mounts the tire on the rim by using the mount/dismount head to force the bead over the rim, and then fills the air chamber of the tire with air to inflate the tire. In most cases, a tire must first be removed from a rim before installing a new tire. This procedure is described in detail in U.S. patent application Ser. No. 08/516,129, the substance of which is incorporated here and by reference, and which is assigned to the Assignee of the present invention.

The design of wheel and tire configurations constantly changes for many reasons, including improved durability and performance. The equipment used for changing tires must change accordingly in order to accommodate these new designs. The present invention is directed to a device used to assist in the changing of a tire.

Recent innovations in tire design have resulted in wider, lower profile tires with stiffer sidewalls. One such tire is referred to as a "run-flat" tire, which is designed to run for a specified period of time after having been punctured. The characteristics of these tires that make them more durable also make them much more difficult to change due to their increased width and decreased flexibility. Further, changing these tires is a more dangerous operation because the operator must apply a greater force to disengage the tire bead from the rim. These and other considerations must be incorporated into the development and design of more effective, efficient and safe tire changers.

To meet this challenge most manufacturers of tire changers have added powered features to their equipment to assist the operator in dealing with the increasing difficulty of changing a tire. These features include powered arms with attached pivoting devices for pushing against the tire to offset the manual effort required by the operator. Currently, all assist devices on competitor's equipment are designed such that the entire arm mechanism must be moved vertically in order to properly position attachments such as blocks and rollers against the tire surface to perform their specified function. Positioning the entire mechanism can be a cumbersome and time consuming process, particularly when the several tires must be changed.

Most of these arm mechanisms consist of a sliding contact block attached to a jointed arm that moves up and down on a vertical guide that is attached to the chassis of the tire changer. The arm is usually powered by an air cylinder. The contact blocks of devices that are currently available aid only in the separation of an upper tire bead from a tire rim. They do not provide any means for assistance in positioning the demount head. Further, they do not aid in lower bead separation. Finally, tires sometimes explode during the inflation step, and the off-centered support offered by these devices does not provide the most effective explosion restraint.

What is needed is a mechanism having a contact block that can be easily positioned over the tire and then raised and lowered to assist in mounting and demounting activities and that provides superior restraint during inflation of the tire.

SUMMARY OF THE INVENTION

The present invention comprises a multi-function helper arm mechanism for use in conjunction with a rim-holding tire changer. The helper arm may either be attached to the existing structure of a tire changer or it may be mounted on a stand-alone unit. The device offers several advantages over other existing designs. For example, the entire arm assembly of other devices moves up and down along a vertical guide which, therefore, requires that the total weight of the arm be moved up or down every time the arm is repositioned. This typically requires a reinforced structure with a power capacity to move the total weight of the mechanism.

The device of the present invention, on the other hand, includes a contact block attached to an adjustable vertical member, such as a cylinder assembly, that is, in turn, mounted on the forward end of a jointed arm. The rear end of the arm is pivotally mounted to the existing structure of the tire changer, typically the tower portion. However, the arm may alternatively be mounted to the tire changer at any convenient and operable location, or it may be mounted to a stand-alone support device.

The vertical member preferably includes a cylinder mechanism with a cylinder shaft and corresponding control means for raising and lowering the cylinder shaft to the desired vertical position. A handle may be provided to assist the operator in properly positioning the helper arm with respect to the tire.

The contact block or foot includes a shoulder having a rim-stop surface that rests on the rim flange and a downwardly projecting heel that may be depressed against the tire bead. The contact block further includes a ramped surface for engaging and forcing the tire sidewall into the drop center of the wheel and a hook for supporting the tire during demounting of the lower bead.

The helper arm of the present invention may be used to accomplish at least four major functions: (1) assisting in mounting and demounting activities by forcing the upper bead of the tire into drop center; (2) assisting the operator during demounting of the lower bead by raising or pulling the tire upward, thereby allowing the lower bead to move into the wheel's drop center; (3) providing explosion restraint when the contact block is positioned against the center of a wheel; and (4) assisting in the positioning of the mount/demount head.

DESCRIPTION OF THE PREFERRED EMBODIMENTS

Applicant's invention will be best understood when considered in light of the following description of the preferred embodiment of the invention, as illustrated in the attached drawings wherein like reference numerals and characters refer to like parts.

Figure 1:
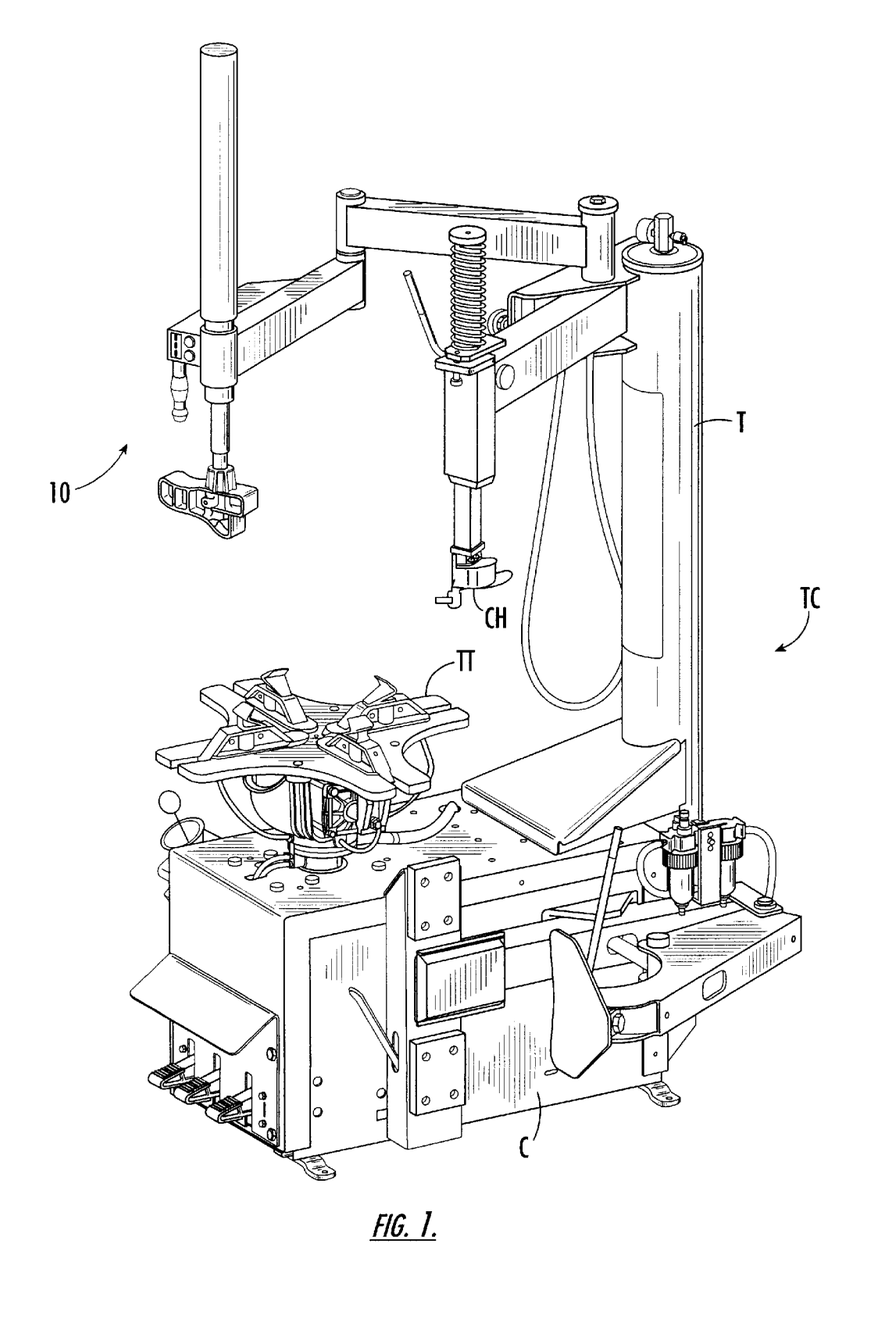
FIG. 1 is a perspective view of the helper arm of the present invention operably attached to a rim-holding tire changer.

With reference to FIG. 1, a typical rim holding tire changer TC includes a chassis C having a table top TT and a tower T. A combination mount/demount head CH is attached to the tower T. The helper arm 10 of the present invention, designated generally by reference numeral 10, is also shown attached to the tower T.

In the preferred embodiment, the helper arm 10 comprises a jointed arm 12 pivotally attached to the tower T at one end. (See FIG. 2). The other end of the arm 12 includes a sleeve 14 configured to receive an adjustable vertical member, such as a cylinder assembly 16. The cylinder assembly 16 includes a cylinder shaft 18 and control means 20 for enabling the vertical adjustment of the shaft 18. A contact block 22 is attached to a distal end of the cylinder shaft 18.

Figure 2:
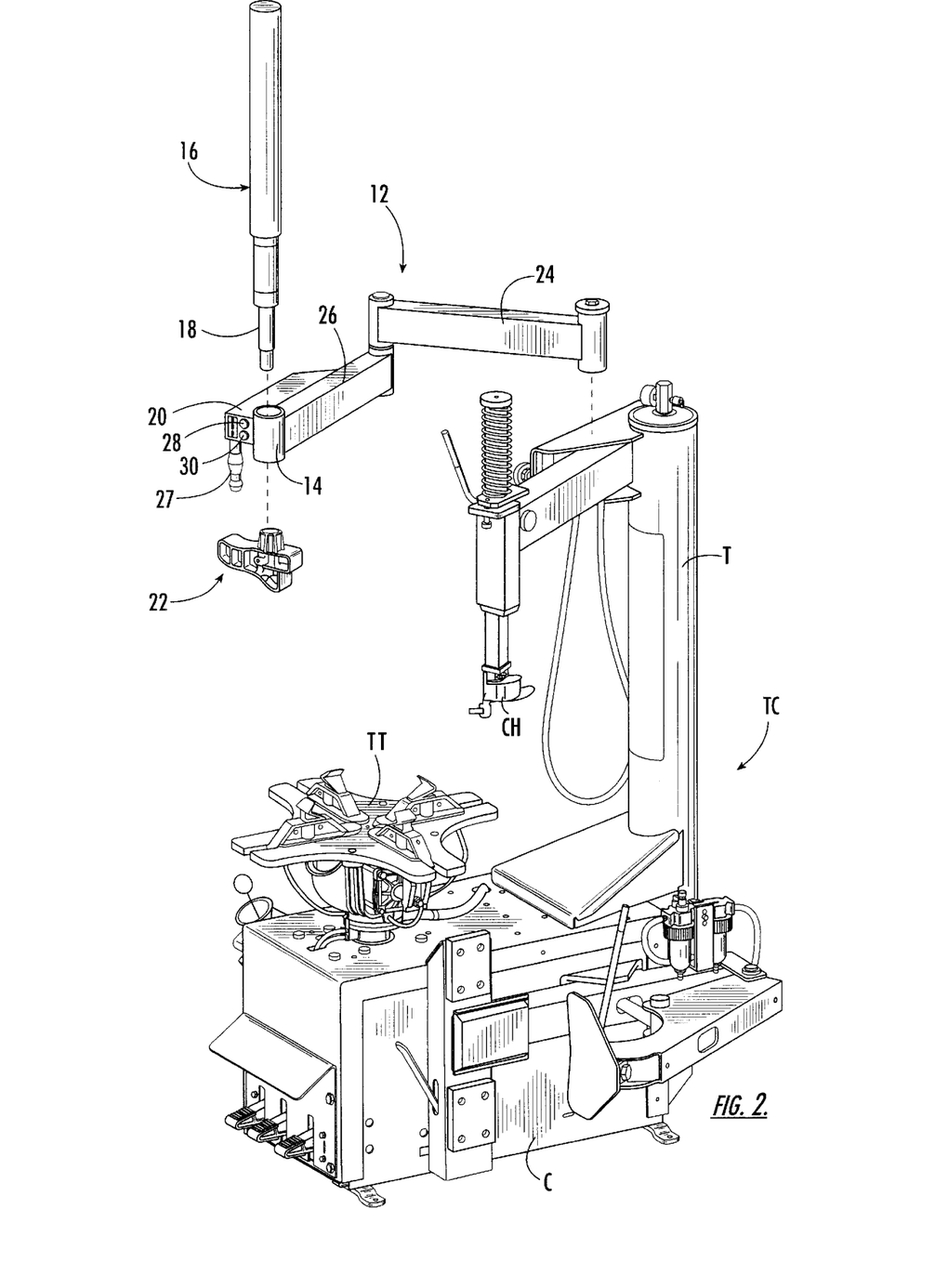
FIG. 2 is an exploded view of the helper arm of FIG. 1, with the helper arm shown detached from the tire changer.

In the preferred embodiment, the jointed arm 12 further comprises a rear arm 24 and a forearm 26. A handle 27 may be provided to assist the operator in positioning the arm 12. Thus, the entire helper arm 10 may be pivoted into position over the tire, and the forearm 26 may be pivoted with respect to the rear arm 24 to achieve proper positioning of the contact block 22. However, the helper arm 10 need not be jointed at all, so long as it is configured to enable the contact block 22 to be properly positioned with respect to the tire. Further, the helper arm 10 need not be attached to the tower T or the tire changer TC. Thus, the helper arm 10 may form part of a stand-alone assembly that may be used in conjunction with an existing tire changer.

The cylinder assembly 16 is vertically mounted within the sleeve 14 attached at the end of forearm 26. However, other suitable means for attaching the cylinder assembly 16 are contemplated to be within the scope of the present invention. The cylinder shaft 18 extends downwardly from the cylinder assembly 16 and may be vertically adjusted to achieve the proper positioning of the contact block 22 relative to a tire mounted on the tire changer. While a pneumatically powered cylinder assembly is preferred, other means for enabling vertical adjustment of the contact block 22 are contemplated including, for example, a screw assembly or the like.

The control means 20 are preferably mounted to the forearm 26 for ease of access, but may be mounted at any convenient location. Alternatively, the control means 20 may comprise a remote device enabling an operator to vertically adjust the cylinder shaft 18 while not immediately adjacent the helper arm 10. The control means 20 preferably includes separate control buttons 28 and 30 for raising and lowering the cylinder shaft 18. However, the control means may include a single toggle switch or other suitable control configurations for enabling the adjustment of the shaft 18.

Figure 3:
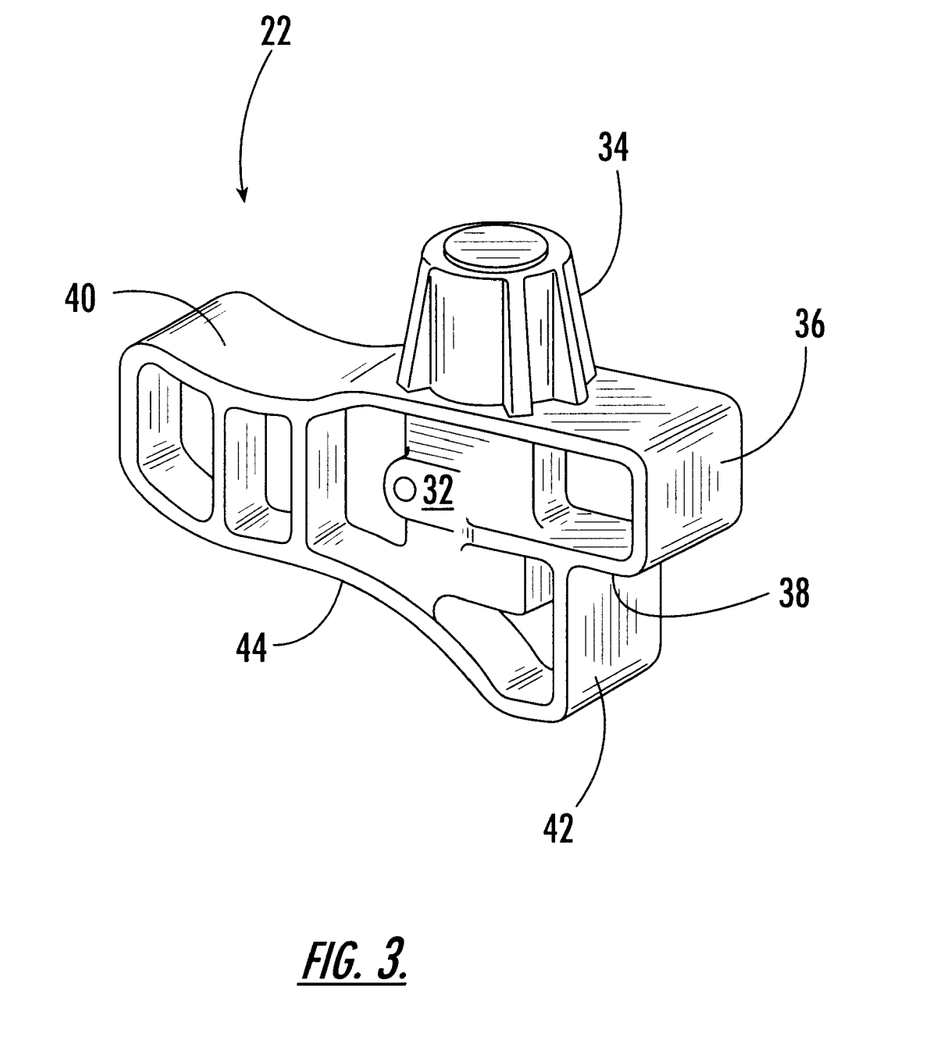
FIG. 3 is a perspective view of the contact block of the present invention.

The contact block or foot 22 is rotatably attached to the distal end of the cylinder shaft 18. One embodiment of the contact block 22, which is shown in FIG. 3, includes a body 32 having an attachment head 34 extending from an upper surface thereof. The attachment head 34 is configured to enable attachment to the cylinder shaft 18. Thus, the attachment head 34 may be threaded or sized to achieve a push-on friction fit, or configured to enable any other suitable means of attachment. For example, the attachment head 34 may also be mechanically attached to the cylinder shaft 18 with a fastener, such as a screw, pin, bolt and the like.

The contact block or foot 22 further includes a shoulder 36 protruding from an end of the body 32. The underside of the shoulder 36 forms a rim-stop surface 38 which seats on the rim flange during mounting and demounting operations. A hook member 40 is formed on the body 32 at the end opposite the shoulder 36. A heel 42 extends downwardly from the body 32 for depressing against the tire bead. Further, an instep or ramped surface 44 extends along a bottom side of the contact block 22 for guiding the tire bead into the drop center of the wheel. The ramped surface 44 extends from the heel 42 upwardly toward the hook member 40.

The configuration of the contact block 22 described above is not intended to be limiting, and other configurations are contemplated to be within the scope of the present invention, so long as the block 22 is able to perform any or all of the various functions described herein relating to the mounting and demounting of a tire.

MODE OF OPERATION

The helper arm 10 of the present invention is a multifunction device for assisting an operator in several activities associated with the changing of a tire 46. Because the contact block or foot 22 is rotatably mounted to the cylinder shaft 18, the foot 22 is able to rotate radially and "track" the rim 48 during mounting and demounting operations.

Figure 4:
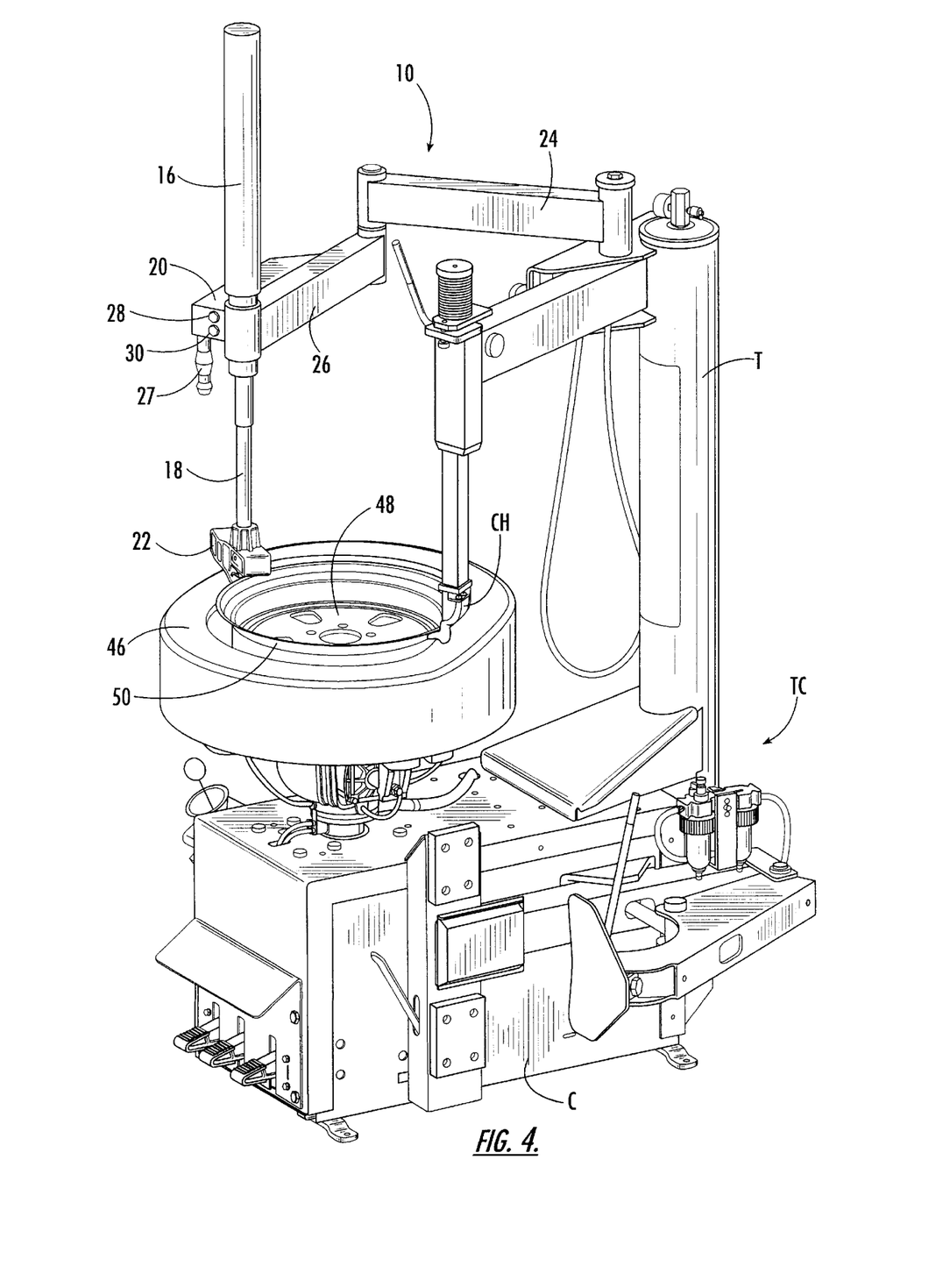
FIG. 4 is a perspective view of the helper arm of the present invention showing the contact foot depressing the tire bead into drop center to assist in mounting the top bead of a tire.

With reference to FIG. 4, the helper arm 10 is used to force the tire bead into drop center during mounting. For reference purposes, the tower T is considered aligned with the twelve o'clock position. The mount/demount head CH is positioned at approximately the three o'clock position. The helper arm 10 is pivoted such that the contact block or foot 22 is initially positioned at approximately the five o'clock position. The mount/demount head CH is lowered to operably engage the tire rim 48. The tire 46 is then rotated such that the mount/demount head CH forces the bead under the rim flange 50. When the foot 22 rotates into the nine o'clock position, it is raised out of engagement with the tire 46. The tire 46 is then rotated until the bead is stretched completely over the rim 48.

Figure 5:
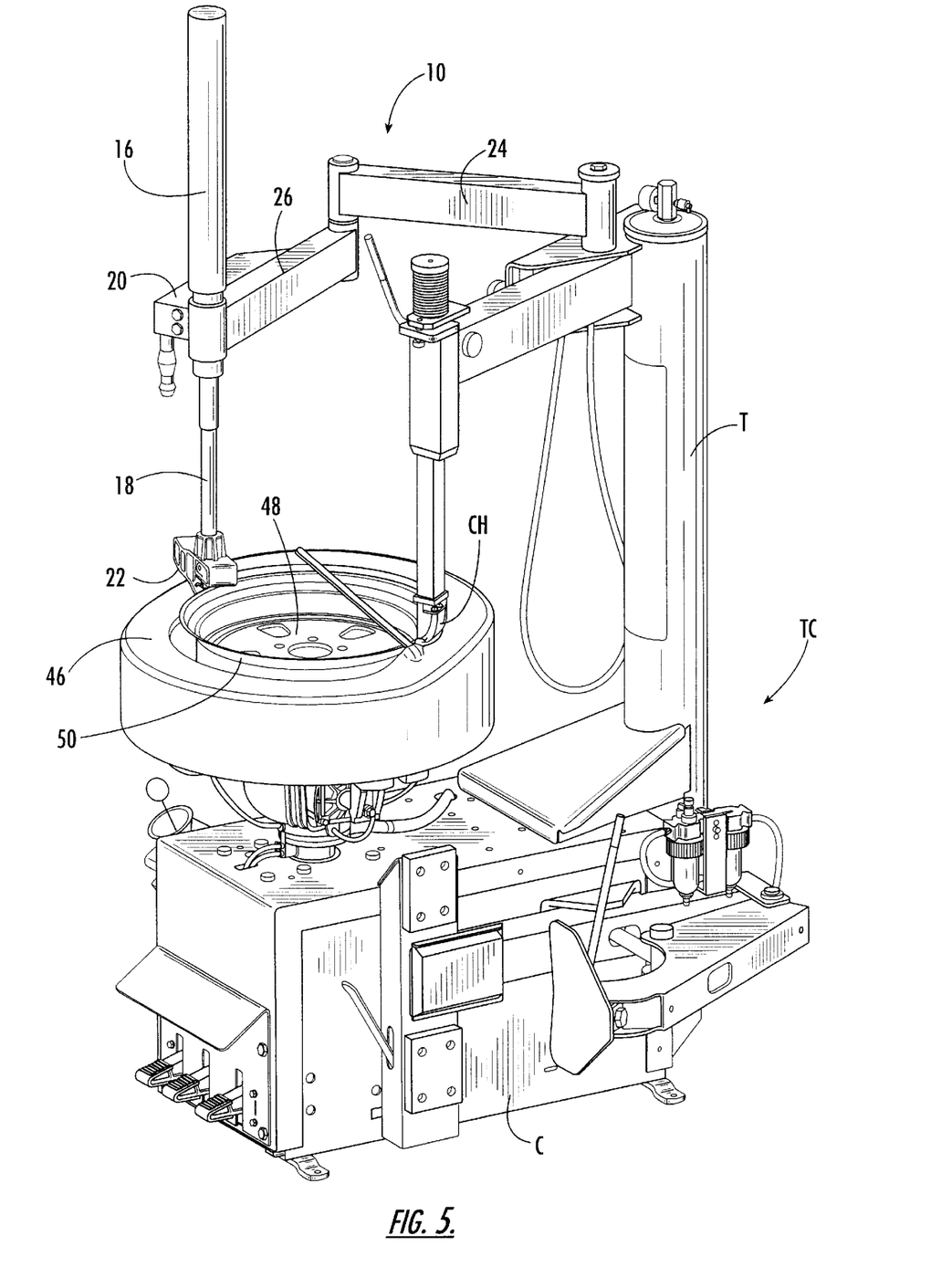
FIG. 5 is a perspective view of the helper arm of the present invention showing the contact foot depressing the tire bead into drop center to assist in demounting a tire.

With reference to FIG. 5, the helper arm 10 is pivoted to the nine o'clock position. The foot 22 is lowered in order to depress the tire bead into drop center. As the tire 46 rotates, the tire bead slides along the instep or ramped surface 44 of the foot 22 and is depressed further into the drop center while the lift tool forces the tire bead over the mount/demount head CH. Afterward, the helper arm 10 is removed and the top bead demounting procedure is completed.

Figure 6:
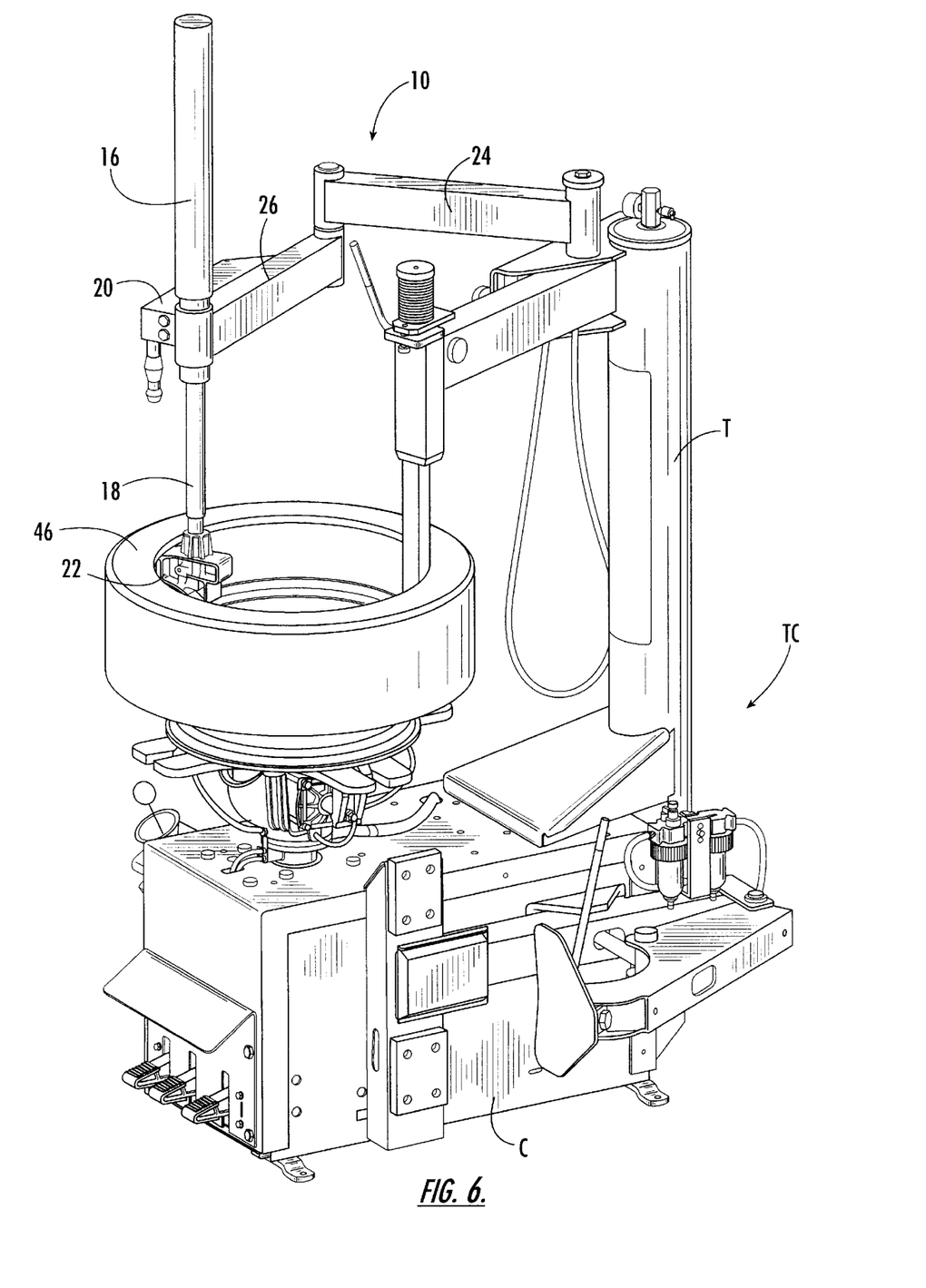
FIG. 6 is a perspective view of the helper arm of the present invention showing the hook of the contact foot supporting the tire during demounting.

With reference to FIG. 6, the helper arm 10 is used to assist the operator during demounting of the lower bead by raising or pulling the tire 46 upward thereby allowing the lower bead to move into the drop center of the wheel. In this operation, the foot 22 is lowered through the center of the tire 46 and the hook member 40 is inserted between the upper and lower beads of the tire, or beneath the lower bead so as to support the tire 46.

Figure 7:
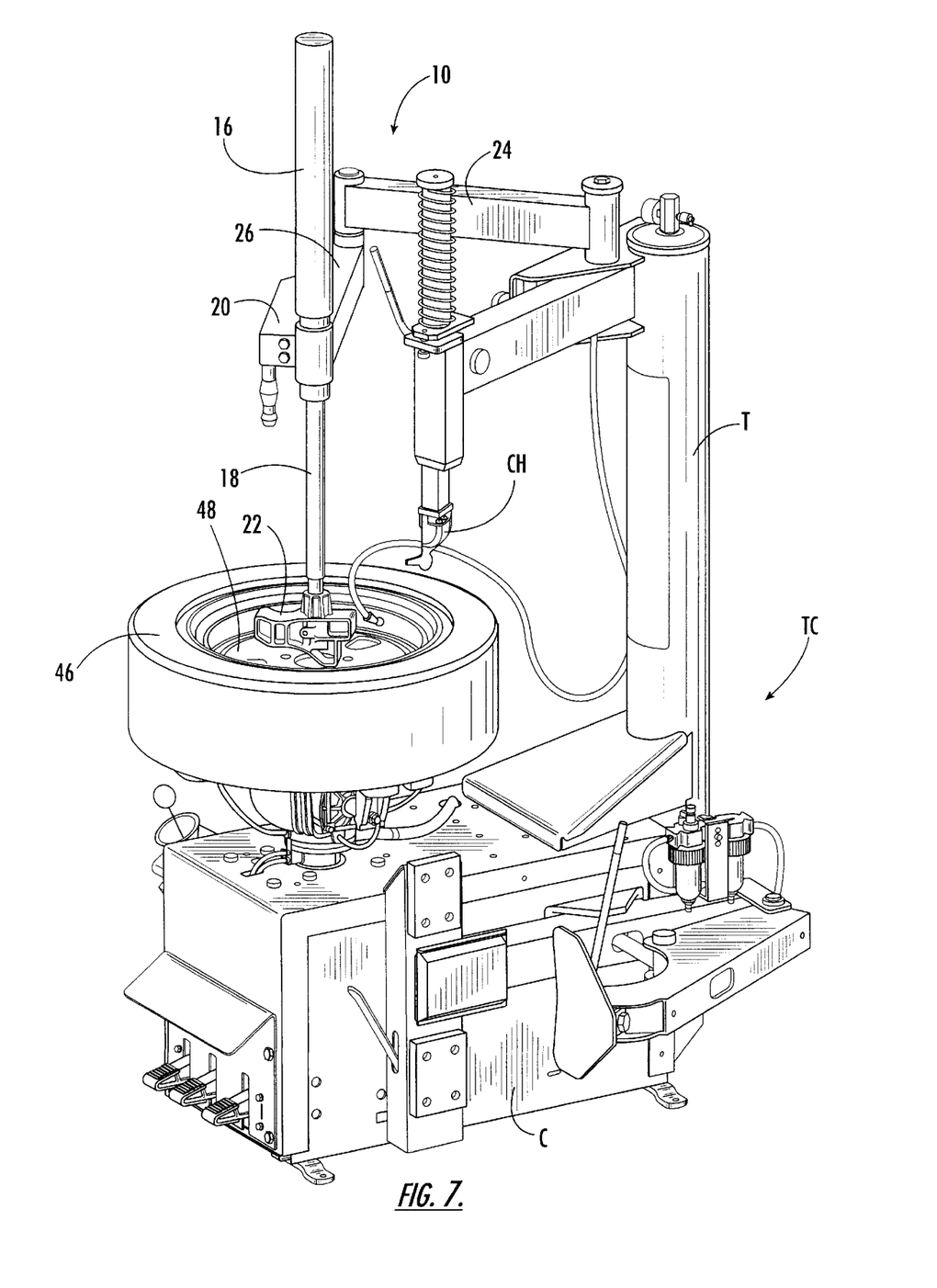
FIG. 7 is a perspective view of the helper arm of the present invention showing the contact foot positioned against the center of the wheel to serve as an explosion restraint.

With reference to FIG. 7, the helper arm 10 is shown centered over the tire rim 48 to serve as an explosion restraint during tire inflation. Accordingly, the foot 22 of the helper arm 10 is lowered against the center of the rim 48. In this configuration, the cylinder assembly 16 is positioned over the centerline of the tire 46 and absorbs shock resulting from energy release more effectively than other designs.

Figure 8:
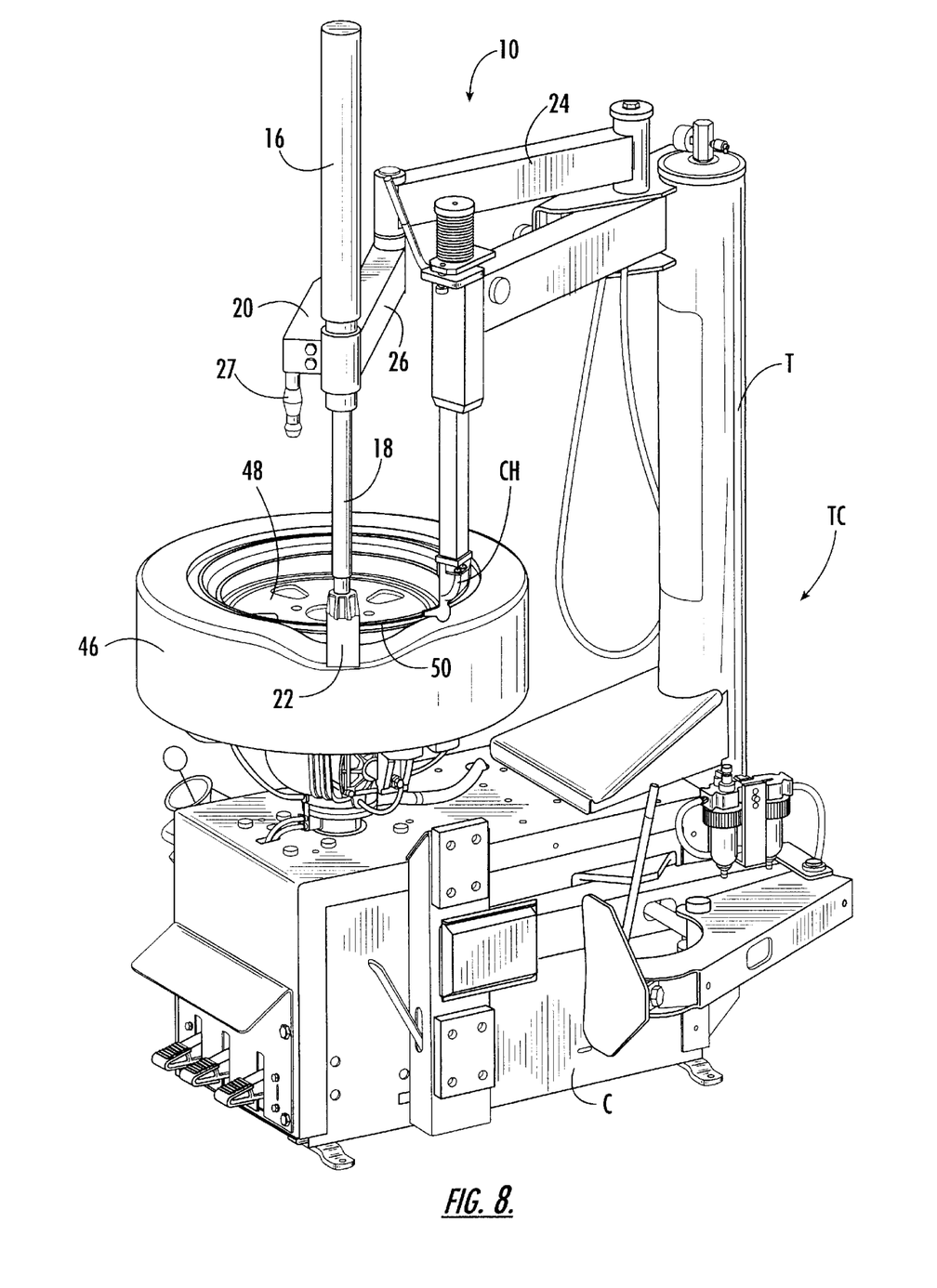
FIG. 8 is a perspective view of the helper arm of the present invention showing the contact foot depressing the tire bead to assist in positioning of the mount/demount head.

Proper positioning of the mount/demount head CH is much more difficult with newer tire designs because the sidewalls are shorter and stiffer. With reference to FIG. 8, the helper arm 10 is used to depress the tire bead away from the rim flange 50 so that the mount/demount head CH may be properly positioned and the lift tool may be inserted between the head and the tire 46. Accordingly, the helper arm 10 is positioned adjacent the mount/demount head CH. After the lift tool has been inserted, the foot 22 of the helper arm 10 is removed and relocated to the nine o'clock position in order to depress the tire bead down into drop center of the rim 48.

A helper arm 10 similar to that of the present invention may be used with any conventional contact block. Further, the contact block 22 shown and described may be used with any conventional helper arm. The contact block 22 shown and described herein includes particular features; however, the contact block 22 may be configured in any shape suitable for performing the described operations.

Thus, although there have been described particular embodiments of the present invention of a new and useful "Helper Arm for a Rim Holding Tire Changer", it is not intended that such references be construed as limitations upon the scope of this invention except as set forth in the following claims.

What is claimed is:

1. A contact block for use in conjunction with an arm operably attached to a rim-holding tire changer, the contact block comprising:

a body having an attachment head extending from the body and configured for operable attachment to the arm;

a shoulder having a surface for engaging the rim flange of a wheel;

a hook member extending from the body opposite the shoulder;

a heel extending downwardly from the body; and a ramped surface extending along the underside of the body between the heel and the hook member; and wherein the body is configured to operably engage a tire and a wheel rim during the mounting and de-mounting of the tire.

2. The contact block of claim 1, wherein the ramped surface is concave.

3. A tire changer apparatus, comprising:

a base;

a rotatable tire holder mounted on the base;

a support tower extending upward from the base;

a swing arm pivotally attached to the support tower;

a vertically adjustable tire changing toolhead, extending downward from the swing arm;

a jointed helper arm assembly pivotally attached to the support tower and pivotable independently of the swing arm, the jointed helper arm assembly having a distal end;

a powered cylinder attached to the distal end of the jointed helper arm assembly and extending downward therefrom; and a contact block attached to the powered cylinder for engaging a side wall of a tire supported on the rotatable tire holder to aid in mounting and demounting the tire.

4. The apparatus of claim 3, wherein the contact block further comprises:

a body having an attachment head configured for mounting the block to the vertical member;

a shoulder protruding from the body for engaging the rim flange of a wheel;

a hook member positioned opposite the shoulder;

a heel extending downwardly from the body for depressing the bead of a tire; and an instep extending along a bottom surface of the body.

5. The apparatus of claim 3, wherein:

a pivotal axis of the swing arm relative to the support tower is vertical.

6. The apparatus of claim 5, wherein:

a pivotal axis of the jointed helper arm assembly relative to the support tower is coaxial with the pivotal axis of the swing arm.

7. The apparatus of claim 3, wherein:

a pivotal axis of the jointed helper arm assembly relative to the support tower is vertical.

8. The apparatus of claim 3, wherein:

the jointed helper arm assembly includes a first arm member pivotally attached to the support tower, and a second arm member pivotally attached to the first arm member, so that the contact block supported from the jointed helper arm assembly can move with a tire rotating on the rotatable tire holder.

9. The apparatus of claim 3, wherein:

the jointed helper arm assembly is vertically fixed relative to the support tower.

\* \* \* \* \*